United States Patent Office 3,188,197
Patented June 8, 1965

3,188,197
METHOD OF REFINING HOT METAL IN AN ELECTRIC ARC FURNACE
Jan-Erik Ostberg, % Surahammars Bruks Aktiebolag, Huvudkontoret, Surahammar, Sweden
No Drawing. Filed Dec. 12, 1962, Ser. No. 244,003
11 Claims. (Cl. 75—56)

This application is a continuation-in-part of my co-pending parent application Serial No. 820,850, filed June 17, 1959, and since abandoned.

The present invention relates to a method of refining hot metal in an electric arc furnace. The term "hot metal" will be used hereinafter in its ordinary sense in the steelmaking industry to refer to the metal as it is ready for refining.

Since World War II electric arc furnaces have been used to an increasing extent for the manufacture of standard and high quality steels. In many cases, the prices of pig iron, iron ore and scrap are such that the manufacturing costs should be more attractive for the arc furnaces than for the basic open hearth furnace. However, while the arc furnace has proved superior in scrap melting, efforts to refine hot metal on a large scale have failed so far although isolated trials have given satisfactory results. These difficulties have limited the expansion of the use of arc furnaces.

The refining of hot metal is primarily an oxidizing process. The oxidation may utilize either gaseous oxygen or oxygen derived from the ore. Oxidation by gaseous oxygen is usually applied in the so-called "pneumatic steel making" processes such as the Bessemer process, the Thomas process or the modern oxygen steel making processes. The open hearth process is, in this respect, something of a compromise. A substantial part of the oxygen used in the refining originates from the combustion gases, but another substantial part is introduced in the bath with the ore. In the arc furnace, the oxidation may be accomplished exclusively with iron ore. A great factor in the comparison of the economies of the processes is that the pneumatic processes inherently give a lower yield because some iron is lost as iron oxides, whereas in processes where the oxygen is obtained from ore there is an increase in yield originating from the iron content of the ore used. This results in a reduction of the amount of hot metal necessary to produce a given amount of product. When the oxidation is carried out entirely with ore, this increase is large. Accordingly, the hot-metal-ore process is theoretically preferable to the pneumatic processes.

In practice, however, this situation is quite different because of the complicated character of the carbon reaction, i.e., the metallurgical reaction at which the carbon content of the hot metal oxidizes and forms substantially carbon monoxide. This action may be expressed by the formula:

$$FeO + C \rightarrow CO + Fe$$

The reaction is highly endothermic. In the pneumatic processes the heat required is obtained by the strongly exothermic reaction, in which iron oxide is formed by combustion of iron with gaseous oxygen. When oxygen from ore is used, heat must be supplied from outside; this heat in the open hearth furnace is provided by the flame and in the electric arc furnace is provided by the arc. The physical dissimilarity is accompanied by a difference in the mechanism of the reactions, which has great significance.

In the pneumatic methods, gas bubbles are introduced often in the molten bath.

When using ore, however, the gas bubbles form within the bath; this is a very sluggish mechanism and is not completely understood. A spontaneous formation of bubbles seems to require enormous pressures above the thermodynamic equilibrium. Carbon reaction in such cases requires an inoculation, which in an irregular way may be obtained from any solid particle having a rugged surface. In the most uniform and reliable way, however, it is obtained from the furnace bottom after the heat has been completely molten. This need for inoculation is one reason for the inertia, which is normally inherent to the carbon reaction, when ore is used. Another serious drawback is the fact that while the ore can be fed so that it partially comes into direct contact with the molten bath, nevertheless it mainly reacts indirectly via the slag.

In any case, the iron ore must be introduced from above the bath and the oxygen must diffuse downwards or be transferred to the lower parts of the melt by stirring of some kind. The solubility of oxygen is a decisive factor and consequently the rate of carbon elimination may be very different at various carbon contents, said rate usually being considerably higher at lower carbon contents than at higher ones.

Another reason for the sluggishness of the carbon reaction is, at times, due to the difficulty the gas bubbles have leaving the bath. The gas bubbles are much lighter in weight than the melt and are accelerated upwards out of the melt with a speed determined, among other factors, by the viscosity of the melt and the size of the bubbles. If the melt is very viscous, the reaction may be retarded very seriously even in the pneumatic processes. In the open hearth furnace and the electric arc furnace the viscosity of the slag offers an additional obstacle. In these processes, where during certain periods the gas bubbles may be precipitated in extremely small, at times colloidal size, the speed of the rising bubbles may be so low that the bath and the slag both get filled by small gas bubbles. The carbon reaction is in this manner transformed in a foaming action. The foaming slag and the foaming melt do not favor rapid heat transfer or rapid metallurgical reactions. This is to some extent better overcome in the electric arc furnace, because of the power of the arc to penetrate at least the slag to some degree. Additions to the slag to improve its fluidity may be an additional help as is any measure to keep the slag volume at a minimum.

Although theoretical considerations give a picture by which the carbon reaction performed in an electric arc furnace under ordinarily prevailing conditions is economically preferred to the pneumatic processes, the factors indicated decrease the productivity of the process, performed in the arc furnace to such an extent that the pneumatic processes are preferred in practice. According to the opinions of some experts in the art it is altogether impossible to process hot metal on a large scale in an arc furnace.

The present invention shows a way to overcome the difficulties, which, as just described, are inherent in the processing of hot metal as it is normally performed in an electric arc furnace.

The hot metal which is referred to can be generally described as molten pig iron. It can be the type of molten metal that comes out of a blast furnace, a submerged arc electric smelting furnace, a cupola furnace, or other similar types of furnaces. The hot metal would normally be subjected to a pretreatment to reduce the silicon content to below one percent and also to reduce the phosphorus and sulfur contents to a low level. In the pretreatment of the hot metal these elements as well as possibly manganese are brought to low percentages by oxidation with iron ore or a Fe-O-rich slag.

The high grade ore which is referred to herein would generally be a ferrous metal ore which did not contain objectionable impurities such as sulfur, phosphorus, copper, lead, zinc, arsenic, etc. and which had a relatively high iron content.

The invention is essentially characterized in that a bath of molten iron constituting a minor part of the final heat, is produced in some way in a furnace. Then hot metal is charged to the furnace in a substantially continuous manner. Substantially simultaneously with the charging of the hot metal, an oxidizing agent is charged into the bath. The rate of charging the hot metal and oxidizing agent is adjusted in such a way that the carbon content and the temperature of the melt are kept substantially constant and are never subjected to a change exceeding a maximum of 0.3 percent and 50° C. respectively during any five minute period, and the energy supplied by the electrical equipment of the furnace and the metallurgical reactions going on in the furnace correspond to the energy required for converting the hot metal to a steel of substantially the same composition and temperature as the molten bath already in the furnace.

The present invention has the desirable attributes of a continuous process. For example, the reacting materials are held in the most favorable possible physical conditions for reaction so that a high rate of reaction can be obtained. The reaction is also readily controlled. The continuous process characteristic during the period of hot metal addition, permits the conditions of the bath to be maintained steady in a range in which the reaction of the carbon and oxygen is most efficient and most readily controlled. The critical limitations of this process are that the carbon must be maintained below 1.5 percent and the temperature above 1500° C. The carbon content can not be allowed to vary more than 0.3 percent during any five minute period, and the temperature during the same period must not vary more than 50° C. The upper limit on the temperature would be the usable limit of the refractories in the furnace lining; generally this is about 1700° C.

During the continuous portion of the process, there is continuously added a trickle of hot metal which may contain, for example, about four percent carbon. Also, there would be continuously added small amounts of high grade ore appropriate to the rate at which the hot metal is being added and containing sufficient oxygen to react with the carbon in the hot metal addition. By regulating the amount of ore added, in relation (1) to the amount of hot metal added and also dependent (2) upon the oxygen content of the ore and (3) the carbon content of the hot metal, relatively steady conditions are maintained in the furnace. Thus the molten metal is introduced substantially continuously into the bath and ore is added at a calculated rate; if the carbon content increases, additional ore is added, and if the carbon content decreases, additional hot metal is added.

It is significant that if all the hot metal were placed in the furnace at one time (batchwise) and then ore charged in an effort to decarbonize the whole mass in a single batch process an uncontrollable reaction would result between the carbon and the oxygen which would cause foaming and boiling over. This reaction could even reach explosive proportions. This is avoided in accordance with this invention by maintaining the furnace temperature so high that the reactions take place as soon as the carbon and oxygen are available one to the other, and the rate of reaction is controlled by varying the rate at which the carbon and oxygen are made available one to the other.

After the process has continued until the required weight of hot metal and ore have been added there will be left a metal bath that is well below one and one-half percent carbon. The heat may then be finished to the various commercial grades of steel by conventional electric furnace steel making methods.

In the following example the process is adapted to a steel making operation in which the feed material for the manufacture is hot metal and recirculating scrap.

*Example*

The holding capacity of the arc furnace is 100 tons, and the transformer capacity is 20,000 kva. The charge consists of 70 percent hot metal and 30 percent solid scrap. The Si and Mn contents of the hot metal are below one percent and the phosphorous and sulphur contents are so low as to be considered nil. The feed ore is high grade. A slight addition of burnt lime is made to the ore to produce a slightly basic slag. The process is carried out in the following manner:

After the preceding tap the furnace is fettled in the usual manner. The scrap is charged to the furnace in a conventional manner, melted completely and refined to a carbon content of about 0.3 percent. Lime is charged together with the scrap in such an amount that the slag gets a basicity corresponding to a ratio of CaO to $SiO_2$ of 2 to 3. Owing to all these measures, the bath boils vigorously at each addition of ore. The temperature is high and consequently the bottom of the furnace is clear melted and in a proper condition to inoculate gas bubbles into the melt. The carbon content is low and consequently, the oxygen content of the melt is high.

The slag, thus, has a favorable composition both with regard to its oxygen releasing ability and its viscosity. Moreover the slag volume can easily be kept to a minimum by tapping the excess. If the slag should tend to be too viscous, the volume may be reduced, which may be carried so far that the slag is almost completely blown away in the arc zones.

Thus preconditioned, the hot metal from a source such as described above, is poured continuously into the melt at a rate of one ton per one to three minutes and simultaneously a corresponding amount of feed ore and burnt lime is added. A vigorous reaction results in the bath. As already emphasized, the carbon reaction is strongly endothermic and consequently the reaction rate is ultimately dependent upon the electrical energy input. With an input rate of 17,000 kw., which is normal in this furnace, about 500 kg. of hot metal may be charged and processed per minute. If the power input were to be kept lower, the rate of charging the hot metal would be decreased correspondingly. The proper amount of ore as calculated from the hot metal and ore analyses is charged together with the hot metal. The process is continued in this continuous manner until the hot metal is entirely or almost entirely charged. Should the slag volume tend to be too high because the content of gangue in the ore or the content of silicon or phosphorus in the hot metal rise too high, it is adjusted by tapping. By means of samples taken out of the bath, the content of carbon and the temperature are controlled and the proper adjustments made to the rate at which hot metal and ore are charged such that the rate of charging the hot metal is increased if the carbon content drops or the temperature rises. The quantity of ore is in a similar manner increased if the carbon content tends to rise and vice versa. The final steps of the processing of the bath depends upon the carbon specification. If the carbon content of the bath is about that specified, the ore additions are stopped before all the hot metal is charged in order to reduce the content of iron oxide in the slag. If the specification calls for a higher carbon content, the ore additions are stopped still earlier in order to recarburize the bath.

Practice has shown a carbon content of 0.3 percent to be suitable for the reaction but this should not be regarded as a definite limit. The carbon content should for a number of other rather evident reasons be kept low in the bath which forms the pool in the furnace. For example, among other reasons, most steels are made in this or lower carbon ranges. The process may be carried out with good results at other carbon ranges up to a limit of 1.5 percent.

Several important factors should be observed in carrying out the process of the invention. The solid part of the charge, if there is any, must be compeltely melted. The temperature of the bath must be high, at least 1500° C., preferably higher. Finally, the boiling action must have started. As stressed before, the rate of the carbon reaction is a function not only of the carbon and oxygen contents of the bath and of the energy supply but it also depends upon a number of physical properties of the melt and of the slag as well as of the furnace itself. Local conditions also influence these conditions to a large extent. These facts are well known to any person skilled in the art. Generally speaking, the aforementioned may be expressed such that the conditions of the furnace and in the molten bath must be adjusted for a good boil at a rather low carbon content. In so doing it may happen that the scrap supply is insufficient to guarantee, when molten, a bath of sufficient depth to avoid local overheating beneath the electrodes. In such a case it is often best to charge part of the hot metal, say 10 tons, together with the scrap. Another variation of the process, which is often favorable is to retain part of the charge in the furnace, when the charge is finished and tapped. The part that is retained makes the pool for the next charge. This procedure makes an almost continuous process.

It is thus characteristic of this novel method of converting hot metal to steel that a minor part of the metal charge is first processed to a low carbon content and a high temperature and covered by a minimum of slag, which is adjusted to good fluidity and high content of iron oxide. As soon as boiling action has started, the major part of the hot metal is poured into the furnace, which simultaneously is given high power input and to which is fed iron ore and in cases lime. The rates at which the hot metal and ore are fed are regulated in relation to each other and to the power input so that the conditions inside the furnace are kept fairly constant except for a gradual decrease or increase of the carbon content or the temperature of the bath, if this is for some reason desired. This method of decarburization makes it possible to control the carbon reaction closely, and, if desired, to keep this rate very high. This manner of carrying out the process is probably in most cases the most favorable one, particularly due to the fact that this method will offer the easiest way to control the large gas quantities.

To a certain extent, it is possible if the reaction rate is high to give up the completely continuous charging of the hot metal and still keep within the limits for carbon content and temperature. In that case, the temperature of the bath in the furnace is raised before charging a portion of hot metal. A quantity of iron ore which is sufficient to take care of about 50 percent of the carbon content of the added hot metal is charged and melted. The reaction which takes place when the hot metal is poured into the thus prepared furnace is very vigorous and is also much favored by the turbulence in the bath during the pouring. Due to the rapid carbon reaction the temperature drops, but it is gradually raised again by the heat from the arcs, and during successive additions of more ore the bath is processed to approximately the starting condition. The temperature is again raised and slag is premelted in a new heavy layer preparatory to pouring the next portion. This modification of the process can sometimes give as high reaction rates as the continuous method, but the enormous gas quantities formed during the pouring will often be very troublesome. There is in addition the risk that the temperature will drop too much or that the carbon content will be raised too much. The quantity of ore charged and premelted in the furnace before the hot metal is charged should therefore not exceed the quantity needed to take care of 50 percent of the carbon content of the hot metal addition as mentioned above. The hot metal addition should likewise be limited to a quantity each time such that the carbon content of the melt in the bath never exceeds 1.5 percent.

It is important that the slag volume be kept at a minimum. As a matter of fact, the process may be carried out almost without any slag at all. A prerequisite is, of course, that the slagforming elements in the hot metal as well as in the ore be kept at low contents. This modification of the process can give certain metallurgical advantages but great care is called for by the additions of ore because of the risk of erosion particularly at the slag line by the cover of iron oxide. Aiming at such conditions is questionable because the process is easily carried out under a moderate cover of slag.

The optimum thickness of the slag is partly a function of the slag composition such that a thicker slag-cover may be tolerated if the slag is fluid. Normally a thickness of four inches should not be exceeded and a thickness of one inch may be regarded as a practical optimum. If the contents of slagforming elements in the hot metal and the ore are too high, the slag volume should therefore be reduced by one or more deslaggings.

The slag volume is an important factor because a moderate slag volume may favor a vigorous carbon reaction whereas a large slag volume may accumulate a considerable quantity of iron oxide in the slag. A large slag volume consequently means a drop in yield. A large slag volume may involve the risk that if some scrap in spite of all precautions has remained unmelted and floats up or if there is something wrong with the furnace bottom or if the hot metal additions get out of control, unintended conditions are created which allow a sudden increase in the reaction rate and the situation may end up in a violent blow-out. On the other hand, there will be a safe limit on the otherwise vigorous reaction, if the amount of iron oxide in the slag is moderate.

Within wide limits, the slag volume is a matter of expediency. The important factor in the process is the carbon reaction. This reaction is a gas reaction and not a slag reaction. Secondary slag reactions should therefore be avoided. If therefore the hot metal has high contents of silicon, phosphorus, manganese, vanadium, titanium or sulphur, it is preferable to remove these elements in one or more preparatory slag reaction processes. The slag reaction, which will be obtained in the arc furnace will thus be just the finishing complement.

In the example described a high grade ore was used. Lump ore, sinter or ore-fines and slick or ore concentrate may be used. The analyses of the ore has a great bearing on the slag volume. The iron content should preferably be over 65 percent, at least 60 percent.

A characteristic feature of the novel process of this invention is that the hot metal is continuously charged at a speed adjusted to the energy demand for the reactions as a function of the sum of energy supply, if any, from these metallurgical reactions and from the arcs.

The productivity of the process is primarily a factor of the energy supply, which again primarily depends upon the electrical energy capacity. There are however certain possibilities to influence the energy balance. One such possibility is to keep the slag volume low, and this often justifies the higher price of a high grade ore. As far as possible, the ore or the lime or both should go into the furnace preheated or premelted. It is advantageous that the ore be completely dry when charged.

A particular advantage of the arc furnace is that energy is supplied at a high temperature. This advantage is accentuated if a secondary energy demand at lower temperatures is supplied from a less expensive source. Obviously, it is of advantage to keep the iron content of the ore high so that a certain content of silicon or phosphorus can be tolerated in the hot metal without affecting the slag volume unfavorably. In such a case, the preparatory slag refining can be limited or entirely abandoned, and the process in the arc furnace will benefit by the latent heat released by the oxidation of these elements.

The novel process of this invention does not require changes in the conventional furnace design; any conventional arc furnace may be used for the process. Gas removal facilities should be provided and these may be of any well-known design. The capacity of these facilities should be sufficient to take care, not only of the quantities which are normally produced by the process, but also to give an extra safety margin in order to avoid irregularities in the process which can cause unpleasant or even dangerous blow-outs. When correctly operated, the novel process is smooth. It offers the possibility of collecting the gases produced and utilize them for the production of, for instance, steam or electric power. The gas suction equipment should, as is conventional, be provided with means for regulating the gas pressure inside the furnace.

The iron ore may be charged in any convenient manner. A suitable way is to perform this automatically and through the roof.

I claim:

1. A method of refining molten iron in a furnace comprising providing a bath of iron having a predetermined temperature of at least 1500° C. and having a maximum carbon content of not more than 1.5 percent, charging to said bath simultaneously and substantially continuously molten pig iron and ferrous metal oxide ore at a rate such that said maximum carbon content of said bath is not exceeded and the rate of change of the carbon content is less than 0.3 percent and the rate of change of temperature is less than 50° C. for any five minute period, and supplying electric power to said furnace to maintain said bath at said predetermined temperature, thereby converting the iron into steel.

2. The process of claim 1 wherein a small quantity of slag is added to the charge.

3. The process of claim 1 wherein the ore has an iron content of at least 60 percent.

4. The process of claim 1 wherein the hot metal when charged has been subjected to a preliminary treatment to reduce the silicon, phosphorus, manganese and sulphur contents by a slagging reaction.

5. Process of claim 1 wherein the amount of ore introduced at any time is not greater that that amount which would be required for the oxidation of the carbon content in the molten pig iron which is introduced at approximately the same time.

6. A method of refining molten iron in an electric arc furnace comprising providing in said furnace a bath of iron at a predetermined temperature of at least 1500° C. and having a carbon content of not more than 1.5 percent, charging simultaneously and in substantially continuous manner molten pig iron and ferrous metal oxide ore at a rate such that a carbon content of 1.5 percent is not exceeded in said bath and such that the rates of change of the carbon content and the temperature are respectively less than 0.3 percent and 50° C. for any five minute period, the ratio of molten pig iron to ore charged at any time being increased when the carbon content drops and decreased when the carbon content rises, supplying a controlled amount of electric power to said furnace to maintain said bath at said temperature of at least 1500° C. thereby converting the iron into steel.

7. A method of refining molten iron in an electric arc furnace comprising providing in said furnace a bath of iron at a predetermined temperature of at least 1500° C. and having a carbon content of not more than 1.5 percent, charging simultaneously and in substantially continuous manner molten pig iron having low silicon and manganese contents and ferrous metal oxide ore at a rate such that a carbon content of 1.5 percent is not exceeded in said bath and such that the rates of change of the carbon content and the temperature are respectively less than 0.3 percent and 50° C. for any five minute period, supplying electric power to said furnace to maintain said bath at said temperature of at least 1500° C., and converting the iron into steel.

8. The process of claim 7 wherein the ore is charged in fused condition.

9. The process of claim 7 wherein the silicon and manganese contents of the hot metal are not greater than one percent.

10. A method of refining molten iron which comprises: heating iron having a carbon content of not more than 1.5% to a temperature of at least 1500° C., adding simultaneously and in a substantially continuous manner, hot metal and ferrous metal oxide ore to said iron at a rate such that the rate of change of carbon content is less than 0.3%, and the temperature changes less than 50° C. during any five minute period, the hot metal, ore, and iron reacting endothermically, supplying heat to said furnace electrically to maintain said iron at said predetermined temperature and changing the ratio of hot metal to ore when the carbon content changes so as to maintain said rate of change of carbon content.

11. A method of refining molten iron by oxidizing impurities therefrom which comprises: adding molten pig iron and ferrous metal oxide ore simultaneously and continuously to a bath of iron which is at a predetermined temperature greater than 1500° C. and which has a carbon content of not more than 1.5%, the ore supplying the oxygen for said oxidation, the rate of addition of said molten pig iron and ore being regulated to maintain the total carbon content of said bath no greater than 1.5% with a rate change of less than 0.3%, while the temperature of said bath changes less than 50° C. for any five minute period, and supplying additional heat electrically to said furnace to maintain said predetermined temperature, and thereby converting the iron into steel.

References Cited by the Examiner

UNITED STATES PATENTS

| 1,035,120 | 8/12 | Hibbard | 75—56 |
| 1,535,311 | 4/25 | Holloway et al. | 75—56 |
| 2,502,259 | 3/50 | Hulme | 75—12 X |

FOREIGN PATENTS

| 121,674 | 1/19 | Great Britain. |
| 130,436 | 8/19 | Great Britain. |
| 658,110 | 10/51 | Great Britain. |

BENJAMIN HENKIN, *Primary Examiner.*